United States Patent
Asai (10) Patent No.: US 12,055,394 B2
(45) Date of Patent: Aug. 6, 2024

(54) INERTIAL NAVIGATION DEVICE ERROR CORRECTION SYSTEM AND INERTIAL NAVIGATION DEVICE ERROR CORRECTION METHOD

(71) Applicant: SUBARU CORPORATION, Tokyo (JP)

(72) Inventor: Takayuki Asai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 330 days.

(21) Appl. No.: 17/691,405

(22) Filed: Mar. 10, 2022

(65) Prior Publication Data

US 2022/0307837 A1    Sep. 29, 2022

(30) Foreign Application Priority Data

Mar. 29, 2021 (JP) .................... 2021-055326

(51) Int. Cl.
    *G01C 21/16*     (2006.01)
    *G01C 21/20*     (2006.01)

(52) U.S. Cl.
    CPC .............. *G01C 21/16* (2013.01); *G01C 21/20* (2013.01)

(58) Field of Classification Search
    CPC ...... G01C 21/16; G01C 21/20; G01C 21/188; G01C 25/005
    See application file for complete search history.

(56) References Cited

U.S. PATENT DOCUMENTS

| | | | |
|---|---|---|---|
| 2019/0372669 A1* | 12/2019 | Ziegler | ............... H04B 10/503 |
| 2020/0293068 A1 | 9/2020 | Hayakawa | |
| 2020/0320886 A1 | 10/2020 | Zhou | |

FOREIGN PATENT DOCUMENTS

| | | |
|---|---|---|
| JP | 2019-115012 A | 7/2019 |
| JP | 2020-147111 A | 9/2020 |

OTHER PUBLICATIONS

Liu, Xiyu, et al. "Measurement-domain cooperative navigation for multi-UAV systems augmented by relative positions." J. Aeronaut. Astronaut. Aviat 52.4 (2020): 403-416. (Year: 2020).*

* cited by examiner

*Primary Examiner* — Alan D Hutchinson
(74) *Attorney, Agent, or Firm* — Rimon P.C.

(57) ABSTRACT

An inertial navigation device error correction system includes an inertial navigation device, a coordinate calculation device, and an error correction device mounted on each of aerial vehicles. The coordinate calculation device calculates coordinates of a second aerial vehicle with respect to a first aerial vehicle. The error correction device calculates azimuth and elevation angles of the second aerial vehicle based on first data on the first aerial vehicle, and azimuth and elevation angles of the second aerial vehicle based on second data on the second aerial vehicle. The error correction device corrects an error caused in the inertial navigation device of the first aerial vehicle, on the basis of angle measurement residuals that are differences between the azimuth and elevation angles of the second aerial vehicle based on the first data and the azimuth and elevation angles of the second aerial vehicle based on the second data.

18 Claims, 4 Drawing Sheets

INERTIAL NAVIGATION DEVICE ERROR CORRECTION SYSTEM AND INERTIAL NAVIGATION DEVICE ERROR CORRECTION METHOD

CROSS-REFERENCE TO RELATED APPLICATIONS

The present application claims priority from Japanese Patent Application No. 2021-055326 filed on Mar. 29, 2021, the entire contents of which are hereby incorporated by reference.

BACKGROUND

The technology relates to an inertial navigation device error correction system and an inertial navigation device error correction method for an inertial navigation device mounted on an aerial vehicle.

In a known method for an unmanned aircraft to control itself to fly autonomously, the unmanned aircraft is mounted with a global positioning system (GPS) receiver, and flies by identifying its own position, for example, on the basis of GPS signals received from a plurality of GPS satellites.

However, the method based on a GPS is susceptible to jamming or surrounding buildings, for example. As a method unsusceptible or hardly susceptible to jamming or surrounding buildings, a method using an inertial navigation device has been known. For example, reference is made to Japanese Unexamined Patent Application Publication Nos. 2020-147111 and 2019-115012.

The inertial navigation device generally calculates its own position (latitude, longitude, and altitude) and attitude (pitch, roll, and yaw), by integrating an acceleration and an angular velocity measured by an acceleration sensor and an angular velocity sensor.

A processor of the unmanned aircraft is configured to perform automatic flight control on the basis of the calculated position and attitude.

SUMMARY

An aspect of the technology provides an inertial navigation device error correction system for aerial vehicles. Each of the aerial vehicles is configured to fly autonomously on the basis of a position and an attitude calculated by an inertial navigation device mounted on the each of the aerial vehicles. The inertial navigation device error correction system includes the inertial navigation device, a wireless communication device, a coordinate calculation device, and an error correction device. The coordinate calculation device is configured to calculate coordinates of a second aerial vehicle of the aerial vehicles with respect to a first aerial vehicle of the aerial vehicles to which the inertial navigation device error correction system is to be applied. The second aerial vehicle is different from the first aerial vehicle. The inertial navigation device, the wireless communication device, the coordinate calculation device, and the error correction device are mounted on the each of the aerial vehicles. The error correction device is configured to calculate an azimuth angle and an elevation angle of the second aerial vehicle based on first data on the first aerial vehicle, on the basis of the coordinates of the second aerial vehicle with respect to the first aerial vehicle calculated by the coordinate calculation device. The error correction device is configured to calculate an azimuth angle and an elevation angle of the second aerial vehicle based on second data on the second aerial vehicle, on the basis of information on the position of the second aerial vehicle calculated by the inertial navigation device of the second aerial vehicle and received from the second aerial vehicle by the wireless communication device, and information on the position of the first aerial vehicle calculated by the inertial navigation device of the first aerial vehicle. The error correction device is configured to correct an error caused in the inertial navigation device of the first aerial vehicle, on the basis of angle measurement residuals that are differences between the azimuth angle and the elevation angle of the second aerial vehicle based on the first data and the azimuth angle and the elevation angle of the second aerial vehicle based on the second data.

An aspect of the technology provides an inertial navigation device error correction method for aerial vehicles. Each of the aerial vehicles is configured to fly autonomously on the basis of a position and an attitude calculated by an inertial navigation device mounted on the each of the aerial vehicles. The inertial navigation device error correction method includes: calculating, by a first aerial vehicle to which the inertial navigation device error correction method is to be applied, coordinates of a second aerial vehicle of the aerial vehicles with respect to the first aerial vehicle of the aerial vehicles, the second aerial vehicle being different from the first aerial vehicle; calculating an azimuth angle and an elevation angle of the second aerial vehicle based on first data on the first aerial vehicle, on the basis of the calculated coordinates of the second aerial vehicle with respect to the first aerial vehicle; calculating an azimuth angle and an elevation angle of the second aerial vehicle based on second data on the second aerial vehicle, on the basis of information on the position of the second aerial vehicle calculated by the inertial navigation device of the second aerial vehicle and received from the second aerial vehicle via a wireless communication device, and information on the position of the first aerial vehicle calculated by the inertial navigation device of the first aerial vehicle; and correcting an error caused in the inertial navigation device of the first aerial vehicle, on the basis of angle measurement residuals that are differences between the azimuth angle and the elevation angle of the second aerial vehicle based on the first data and the azimuth angle and the elevation angle of the second aerial vehicle based on the second data.

An aspect of the technology provides an inertial navigation device error correction system for aerial vehicles. Each of the aerial vehicles being configured to fly autonomously on the basis of a position and an attitude calculated by an inertial navigation device mounted on the each of the aerial vehicles. The inertial navigation device error correction system includes the inertial navigation device, a wireless communication device, a coordinate calculation device, and circuitry. The coordinate calculation device is configured to calculate coordinates of a second aerial vehicle of the aerial vehicles with respect to a first aerial vehicle of the aerial vehicles to which the inertial navigation device error correction system is to be applied. The second aerial vehicle is different from the first aerial vehicle. The inertial navigation device, the wireless communication device, the coordinate calculation device, and the circuitry are mounted on the each of the aerial vehicles. The circuitry is configured to calculate an azimuth angle and an elevation angle of the second aerial vehicle based on first data on the first aerial vehicle, on the basis of the coordinates of the second aerial vehicle with respect to the first aerial vehicle calculated by the coordinate calculation device. The circuitry is configured to calculate an azimuth angle and an elevation angle of the second aerial vehicle based on second data on the second aerial vehicle, on the basis of information on the position of the second aerial vehicle calculated by the inertial navigation device of the second aerial vehicle and received from the second aerial vehicle by the wireless communication device, and information on the position of the first aerial vehicle calculated by the inertial navigation device of the first aerial vehicle. The circuitry is configured to correct an error caused in the inertial navigation device of the first aerial vehicle, on the basis of angle measurement residuals that are differences between the azimuth angle and the elevation angle of the second aerial vehicle based on the first data and the azimuth angle and the elevation angle of the second aerial vehicle based on the second data.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Measured values of an acceleration sensor and an angular velocity sensor include a bias error, in addition to a randomly caused random error. The bias error is a signal, i.e., an error, generated by the sensor in a case where there is no rotation or acceleration. This bias error serves as one of main causes of an error in calculation of a position and an attitude by an inertial navigation device.

This can raise a concern not only in a case of an unmanned aircraft, but also for an inertial navigation device mounted on a manned aerial vehicle.

It is desirable to provide an inertial navigation device error correction system and an inertial navigation device error correction method that make it possible to appropriately correct an error, such as a bias error, caused in an inertial navigation device mounted on an aerial vehicle.

In the following, an inertial navigation device error correction system and an inertial navigation device error correction method according to some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference numerals to avoid redundant description.

[Inertial Navigation Device Error Correction System]

Figure 1:
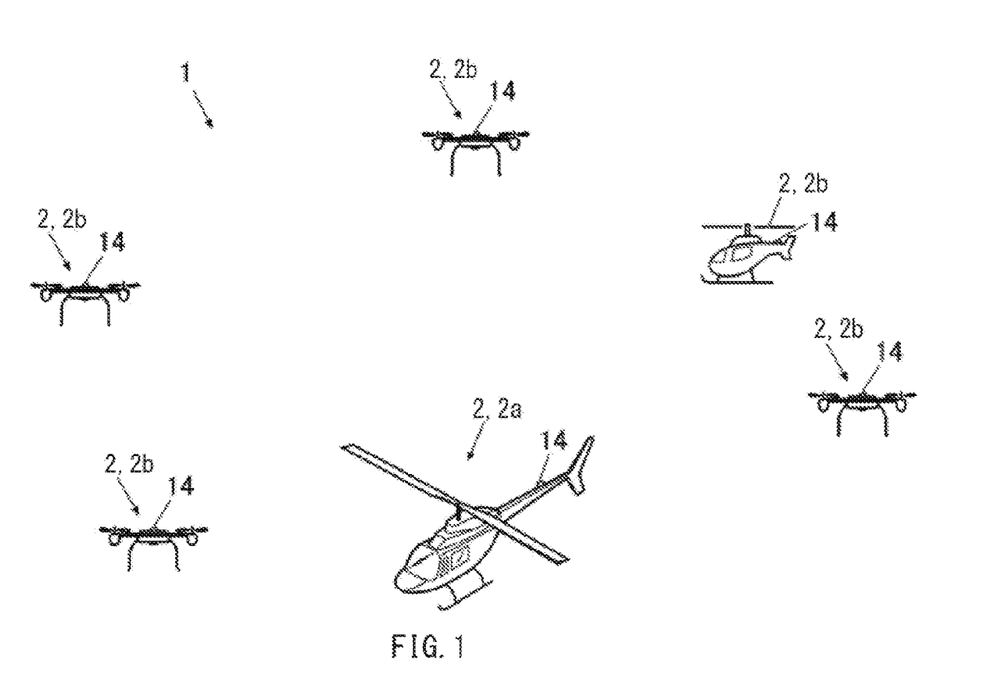
FIG. 1 is a diagram illustrating an inertial navigation device error correction system according to one example embodiment of the technology and including a plurality of aerial vehicles that fly autonomously.

In an inertial navigation device error correction system 1 according to the example embodiment, as illustrated in FIG. 1, a plurality of aerial vehicles 2 are each mounted with an inertial navigation device and a wireless communication device to be described later, for example, and fly autonomously. The aerial vehicles 2 are each configured to correct an error caused in the inertial navigation device mounted on the aerial vehicle, while performing wireless communication with each other, for example.

The aerial vehicle 2 may be an unmanned aircraft, or may be a manned aircraft.

The aerial vehicles 2 may be, for example, consort aerial vehicles that act in cooperation with each other, or may be independent aerial vehicles that happen to fly close to each other.

The aerial vehicles 2 may be only two aerial vehicles of an own aerial vehicle 2a and another aerial vehicle 2b, or may be three or more aerial vehicles. In one embodiment, the own aerial vehicle 2a may serve as a "first aerial vehicle". In one embodiment, the other aerial vehicle 2b may serve as a "second aerial vehicle".

Described below is an example of the inertial navigation device error correction system 1 according to the example embodiment.

Figure 2:
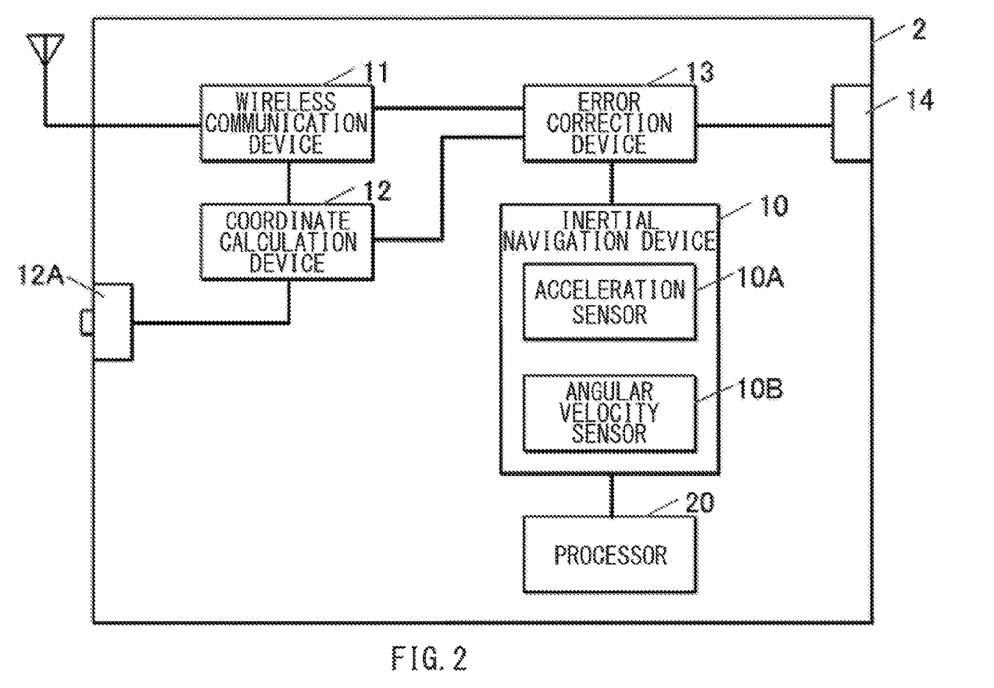
FIG. 2 is a block diagram illustrating a configuration related to the inertial navigation device error correction system in each aerial vehicle.

FIG. 2 is a block diagram illustrating a configuration related to the inertial navigation device error correction system in each aerial vehicle.

[Configuration for Each Flight Vehicle]

The aerial vehicles 2 are each mounted with an inertial navigation device 10, a wireless communication device 11, a coordinate calculation device 12, and an error correction device 13. Each aerial vehicle 2 is configured to fly autonomously on the basis of a position (latitude, longitude, and altitude) and an attitude (pitch, roll, and yaw) calculated by the mounted inertial navigation device 10.

In the example embodiment, each aerial vehicle 2 may be mounted with a lamp 14. Each aerial vehicle 2 may blink the lamp 14 in a predetermined blinking pattern to notify another aerial vehicle 2 (hereinafter referred to as another aerial vehicle) of its own identification information (ID) by means of the blinking pattern of the lamp 14.

The inertial navigation device 10 may include an acceleration sensor 10A and an angular velocity sensor 10B. The inertial navigation device 10 may calculate the position and the attitude of the aerial vehicle 2 by integrating an acceleration and an angular velocity outputted by the acceleration sensor 10A and the angular velocity sensor 10B, and transmit information on the calculated position and attitude to a processor 20 of the aerial vehicle 2.

In addition, the inertial navigation device 10 may assign the ID of the aerial vehicle 2 mounted with the inertial navigation device 10 to, of the information on the calculated position and attitude, the information on the position (latitude, longitude, and altitude), and issue the information on the position to all the other aerial vehicles via the wireless communication device 11.

"All the other aerial vehicles" may refer to aerial vehicles 2 that are able to communicate with the own aerial vehicle via the wireless communication device 11.

The wireless communication device 11 may receive information on a position (latitude, longitude, and altitude) of another aerial vehicle calculated by the inertial navigation device 10 of the other aerial vehicle, assigned with an ID of the other aerial vehicle, and issued from the other aerial vehicle. The wireless communication device 11 may transmit the received information on the position of the other aerial vehicle assigned with the ID of the other aerial vehicle to the coordinate calculation device 12 and the error correction device 13.

[Calculation of Coordinates of Other Aerial Vehicle with Respect to Own Aerial Vehicle]

The coordinate calculation device 12 is configured to calculate coordinates (az, el) of another aerial vehicle with respect to the own aerial vehicle (i.e., the aerial vehicle 2 mounted with the coordinate calculation device 12).

Described below is how the coordinate calculation device 12 calculates the coordinates (az, el) of the other aerial vehicle with respect to the own aerial vehicle in the example embodiment.

The coordinate calculation device 12 may include a camera 12A. It is assumed that the camera 12A is configured to be able to change an orientation in any direction or within a predetermined range. It is also possible to use an omnidirectional camera, for example, as the camera 12A.

Although the example embodiment describes a case where the camera 12A captures a moving image, the camera 12A may be configured to capture a still image. Note that, in a case where the camera 12A captures a still image, a mechanism configured to acquire the ID of another aerial vehicle imaged in the image captured by the camera 12A may be newly provided.

The coordinate calculation device 12 may analyze the moving image captured by the camera 12A, and determine the blinking pattern of the lamp 14 of another aerial vehicle imaged in the image (i.e., the image of each frame included in the moving image), thereby determining the ID of the other aerial vehicle imaged in the image.

Figure 3:
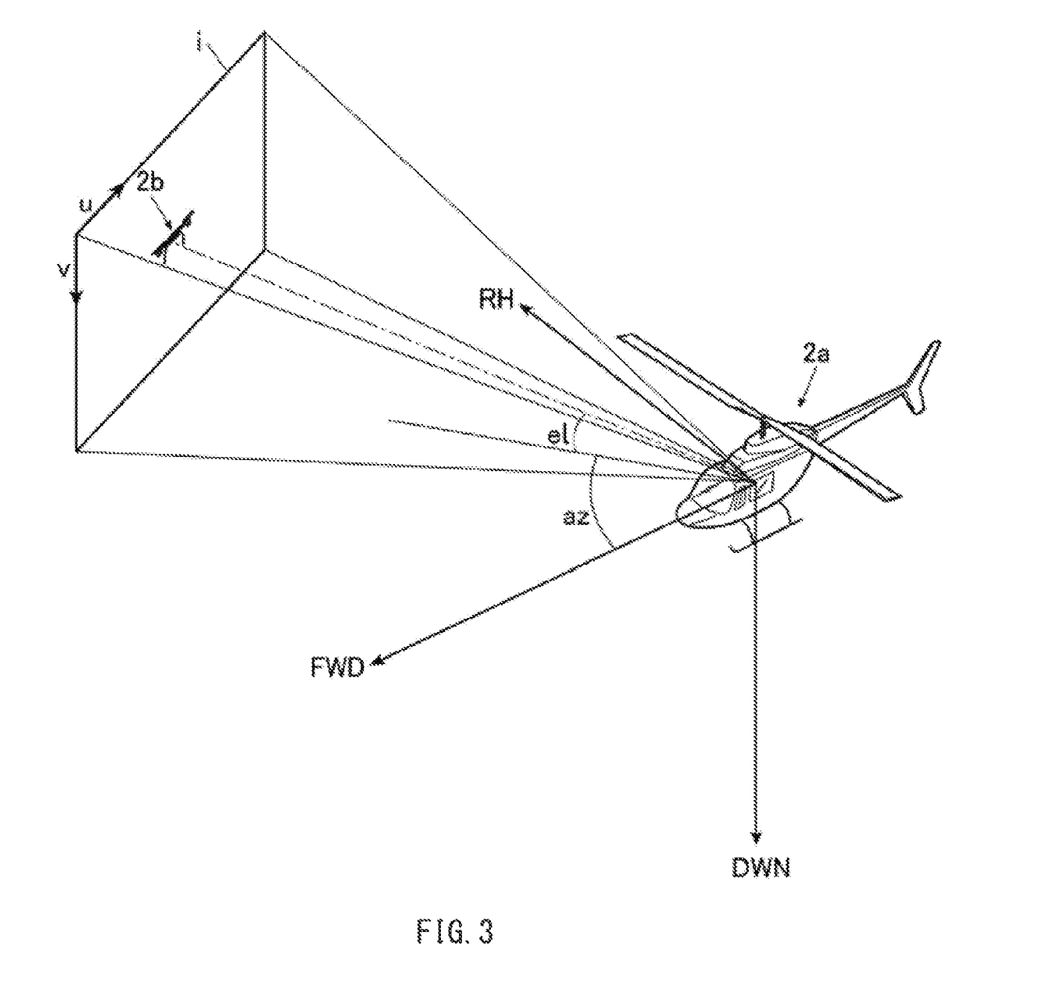
FIG. 3 is an explanatory diagram illustrating an example of performing coordinate transformation on image coordinates of another aerial vehicle in an image to calculate coordinates of the other aerial vehicle with respect to an own aerial vehicle.

The wireless communication device 11 may receive the information on the position issued from the other aerial vehicle imaged in the moving image (i.e., the information on the position assigned with the determined ID), and transmit the information on the position to the coordinate calculation device 12. Upon receiving the information on the position, the coordinate calculation device 12 may determine image coordinates (u, v) of the other aerial vehicle 2b in the image (the image of one frame included in the moving image) captured at the timing, as illustrated in FIG. 3.

The coordinate calculation device 12 may calculate the coordinates (az, el) of the other aerial vehicle 2b with respect to the own aerial vehicle 2a, on the basis of the orientation of the camera 12A and the image coordinates (u, v) of the other aerial vehicle 2b at the above timing.

For example, the coordinate calculation device 12 may perform coordinate transformation on the image coordinates (u, v) of the other aerial vehicle 2b in the image. The coordinate calculation device 12 may thus calculate, in an orthogonal coordinate system having a forward (FWD) axis, a right hand (RH) axis, and a down (DWN) axis of the own aerial vehicle 2a as coordinate axes, an azimuth angle (az) and an elevation angle (el) with respect to the forward (FWD) axis of the other aerial vehicle 2b, as illustrated in FIG. 3.

Described above is the case where the coordinate calculation device 12 analyzes the image captured by the camera 12A and calculates the coordinates (az, el) of the other aerial vehicle 2b with respect to the own aerial vehicle 2a. However, the technology is not limited to this case. For example, the coordinate calculation device 12 may be configured to use information obtained by a radar to calculate the coordinates (az, el) of the other aerial vehicle 2b with respect to the own aerial vehicle 2a.

The coordinate calculation device 12 may perform the processes described above for all the other aerial vehicles 2b. Upon calculating the coordinates (az, el) of the other aerial vehicle 2b with respect to the own aerial vehicle 2a, the coordinate calculation device 12 may assign the determined ID of the other aerial vehicle 2b to the calculated coordinates (az, el) of the other aerial vehicle 2b with respect to the own aerial vehicle 2a, and transmit the coordinates to the error correction device 13.

[Correction of Error Caused in Inertial Navigation Device]

Description is given next on how the error correction device 13 corrects an error caused in the inertial navigation device 10 of the own aerial vehicle 2a in the example embodiment. Note that the coordinate calculation device 12, for example, may be configured to perform some of processes of the error correction device 13 described below. It is also possible to configure the coordinate calculation device 12 and the error correction device 13, for example, as one device.

Description is also given on the inertial navigation device error correction method according to the example embodiment.

Figure 4:
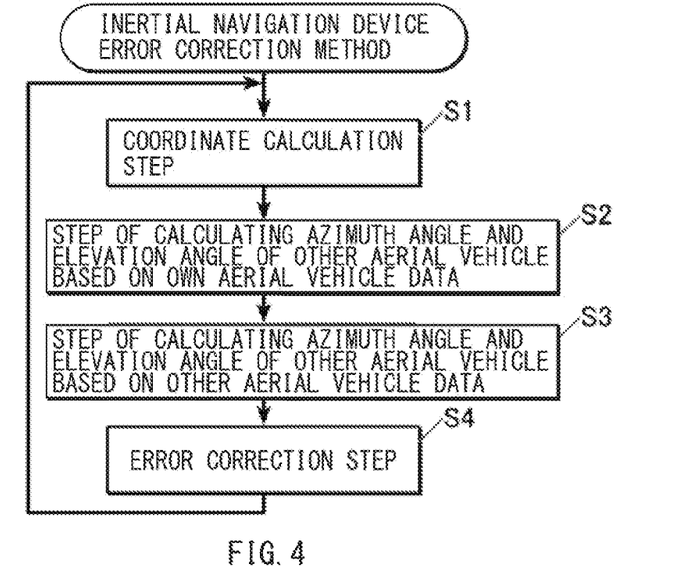
FIG. 4 is a flowchart illustrating steps of an inertial navigation device error correction method according to the example embodiment.

The inertial navigation device error correction method may include steps illustrated in FIG. 4. How to correct the error caused in the inertial navigation device 10 of the own aerial vehicle 2a is described with reference to a flow of the steps.

A coordinate calculation step (step S1) in which the coordinate calculation device 12 calculates the coordinates (az, el) of the other aerial vehicle 2b with respect to the own aerial vehicle 2a is described above.

[Calculation of Azimuth Angle and Elevation Angle of Other Aerial Vehicle Based on Own Aerial Vehicle Data]

In step S2, the error correction device 13 calculates an azimuth angle and an elevation angle of the other aerial vehicle 2b based on own aerial vehicle data, on the basis of the coordinates (az, el) of the other aerial vehicle 2b with respect to the own aerial vehicle 2a calculated by the coordinate calculation device 12. This step may be referred to as a step of calculating the azimuth angle and the elevation angle of the other aerial vehicle based on the own aerial vehicle data.

In this step, information on the calculated coordinates (az, el) of the other aerial vehicle 2b with respect to the own aerial vehicle 2a may be transmitted from the coordinate calculation device 12 to the error correction device 13. Upon receiving the information, the error correction device 13 may acquire information on the attitude (pitch, roll, and yaw) of the own aerial vehicle 2a calculated by the inertial navigation device 10 of the own aerial vehicle 2a at the timing of receiving the information on the position from the other aerial vehicle 2b imaged in the image.

Figure 5:
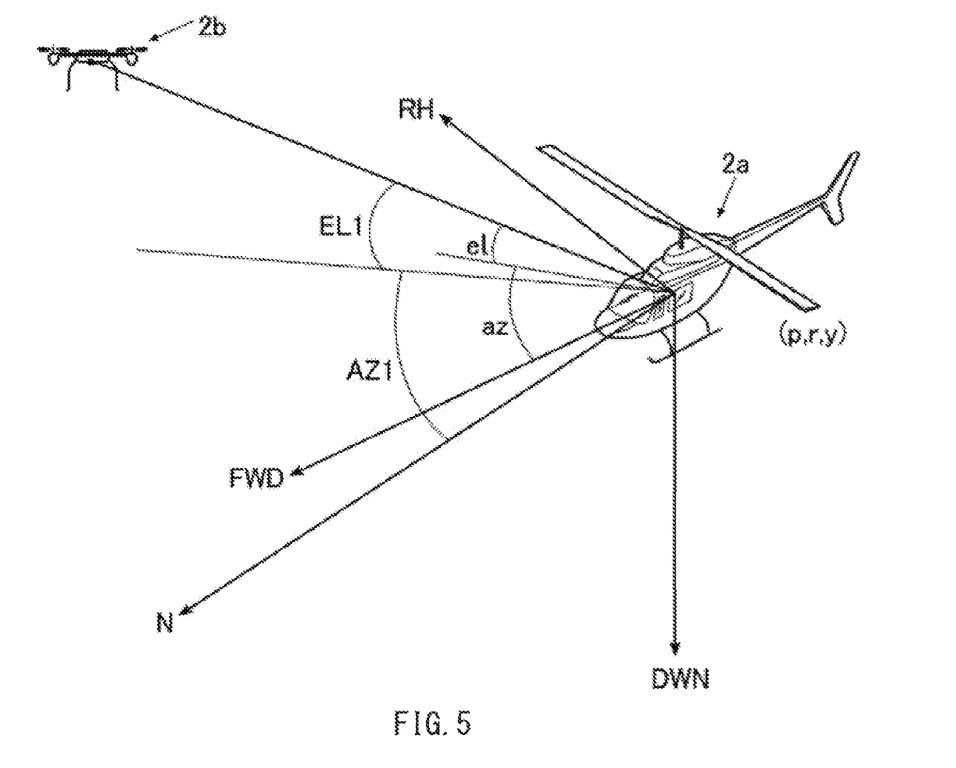
FIG. 5 is an explanatory diagram illustrating an example of calculating an azimuth angle and an elevation angle of the other aerial vehicle based on own aerial vehicle data on the basis of the coordinates of the other aerial vehicle with respect to the own aerial vehicle and an attitude of the own aerial vehicle.

As illustrated in FIG. 5, the error correction device 13 may calculate an azimuth angle AZ1 from true north and an elevation angle EL1 from a horizontal plane of the other aerial vehicle 2b, on the basis of the coordinates (az, el) of the other aerial vehicle 2b with respect to the own aerial vehicle 2a calculated by the coordinate calculation device 12, and the information on the attitude (pitch p, roll r, and yaw y) of the own aerial vehicle 2a calculated by the inertial navigation device 10 of the own aerial vehicle 2a. The true north is represented by a N axis in FIG. 5.

However, "the azimuth angle AZ1 and the elevation angle EL1 of the other aerial vehicle 2b" in this case are values calculated on the basis of the attitude (pitch p, roll r, and yaw y) of the own aerial vehicle 2a calculated by the inertial navigation device 10 of the own aerial vehicle 2a, and can include an error. "The azimuth angle AZ1 and the elevation angle EL1 of the other aerial vehicle 2b" in this case may therefore be referred to as "the azimuth angle AZ1 and the elevation angle EL1 of the other aerial vehicle based on the own aerial vehicle data".

[Calculation of Azimuth Angle and Elevation Angle of Other Aerial Vehicle Based on Other Aerial Vehicle Data]

In step S3, the error correction device 13 calculates an azimuth angle and an elevation angle of the other aerial vehicle 2b based on other aerial vehicle data, on the basis of the information on the position (latitude, longitude, and altitude) of the other aerial vehicle 2b calculated by the inertial navigation device 10 of the other aerial vehicle 2b and received from the other aerial vehicle 2b by the wireless communication device 11, and the information on the position (latitude, longitude, and altitude) of the own aerial vehicle 2a calculated by the inertial navigation device 10 of the own aerial vehicle 2a. The information on the position (latitude, longitude, and altitude) of the own aerial vehicle 2a may be calculated at the timing of receiving the information on the position of the other aerial vehicle 2b by the wireless communication device 11. This step may be referred to as a step of calculating the azimuth angle and the elevation angle of the other aerial vehicle based on the other aerial vehicle data.

Figure 6:
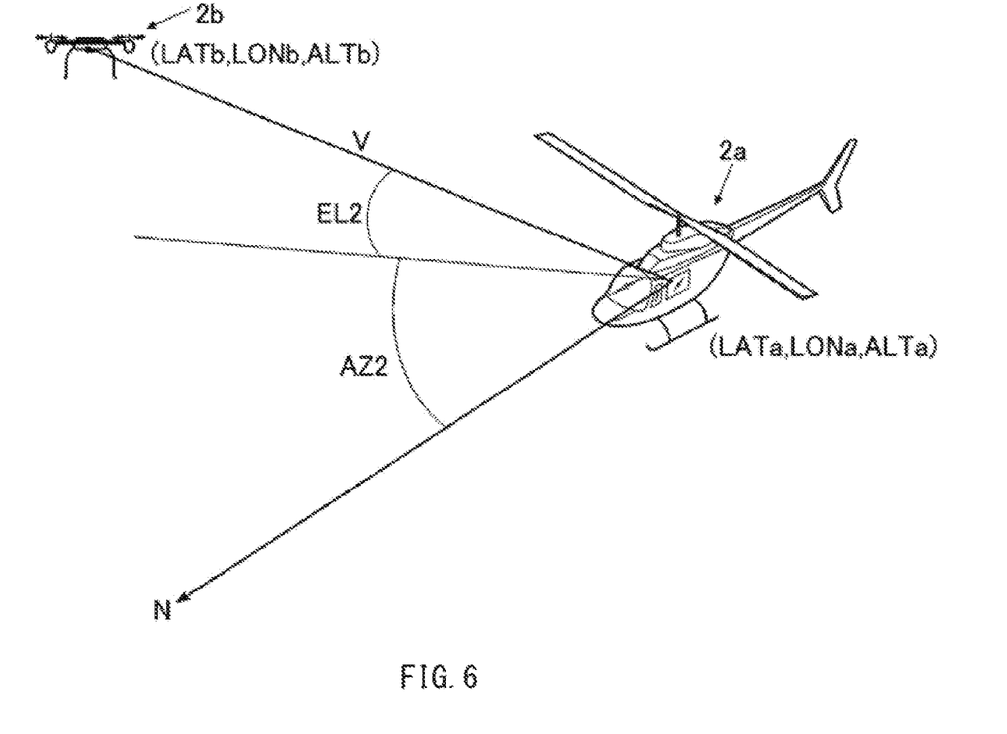
FIG. 6 is an explanatory diagram illustrating an example of calculating an azimuth angle and an elevation angle of the other aerial vehicle based on other aerial vehicle data on the basis of a position of the other aerial vehicle calculated by the inertial navigation device of the other aerial vehicle and a position of the own aerial vehicle calculated by the inertial navigation device of the own aerial vehicle.

In this step, as illustrated in FIG. 6, the error correction device 13 may calculate, as an azimuth angle AZ2 and an elevation angle EL2 of the other aerial vehicle 2b, the azimuth angle AZ2 from the true north and the elevation angle EL2 from the horizontal plane of a vector V that is directed from the position (latitude LATa, longitude LONa, and altitude ALTa) of the own aerial vehicle 2a calculated by the inertial navigation device 10 of the own aerial vehicle 2a toward the position (latitude LATb, longitude LONb, and altitude ALTb) of the other aerial vehicle 2b calculated by the inertial navigation device 10 of the other aerial vehicle 2b.

"The azimuth angle AZ2 and the elevation angle EL2 of the other aerial vehicle 2b" in this case are values calculated on the basis of the position (latitude, longitude, and altitude) of the other aerial vehicle 2b that has been calculated by the inertial navigation device 10 of the other aerial vehicle 2b and can include an error. "The azimuth angle AZ2 and the elevation angle EL2 of the other aerial vehicle 2b" in this case may therefore be referred to as "the azimuth angle AZ2 and the elevation angle EL2 of the other aerial vehicle based on the other aerial vehicle data" to be distinguished from "the azimuth angle AZ1 and the elevation angle EL1 of the other aerial vehicle based on the own aerial vehicle data" described above.

The processes of step S2 of calculating the azimuth angle and the elevation angle of the other aerial vehicle based on the own aerial vehicle data and step S3 of calculating the azimuth angle and the elevation angle of the other aerial vehicle based on the other aerial vehicle data may be performed in an opposite order, or may be performed concurrently.

[Error Correction]

Subsequently, in step S4, the error correction device 13 calculates angle measurement residuals ($\Delta AZ$, $\Delta EL$) that are differences between the azimuth angle AZ1 and the elevation angle EL1 of the other aerial vehicle 2b based on the own aerial vehicle data calculated in step S2 and the azimuth angle AZ2 and the elevation angle EL2 of the other aerial vehicle 2b based on the other aerial vehicle data calculated in step S3. On the basis of the calculated angle measurement residuals ($\Delta AZ$, $\Delta EL$), the error correction device 13 corrects an error caused in the inertial navigation device 10 of the own aerial vehicle 2a. In the example embodiment, the error may be respective bias errors in the acceleration sensor 10A and the angular velocity sensor 10B of the inertial navigation device 10. This step may be referred to as an error correction step.

In one example, the error correction device 13 may calculate the angle measurement residuals ($\Delta AZ$, $\Delta EL$) by calculating:

$$\Delta AZ = AZ1 - AZ2 \qquad (1);\text{ and}$$

$$\Delta EL = EL1 - EL2 \qquad (2).$$

On the basis of the calculated angle measurement residuals ($\Delta AZ$, $\Delta EL$), the error correction device 13 may calculate respective sensor bias values of the acceleration sensor 10A and the angular velocity sensor 10B of the inertial navigation device 10.

In the example embodiment, the error correction device 13 may correct the respective bias errors in the acceleration sensor 10A and the angular velocity sensor 10B of the inertial navigation device 10, by adding the calculated sensor bias value of the acceleration sensor 10A to the acceleration outputted by the acceleration sensor 10A of the inertial navigation device 10, and adding the calculated sensor bias value of the angular velocity sensor 10B to the angular velocity outputted by the angular velocity sensor 10B of the inertial navigation device 10.

The inertial navigation device 10 may calculate the position (latitude, longitude, and altitude) and the attitude (pitch, roll, and yaw) of the own aerial vehicle 2a by integrating the corrected acceleration and angular velocity.

The inertial navigation device error correction system 1 and the inertial navigation device error correction method according to the example embodiment may repeatedly perform the steps S1 to S4 described above, and perform the processes described above for all the other aerial vehicles 2b. The inertial navigation device error correction system 1 and the inertial navigation device error correction method may thus correct the acceleration and the angular velocity outputted by the acceleration sensor 10A and the angular velocity sensor 10B of the inertial navigation device 10, thereby correcting an error, such as a bias error, caused in the inertial navigation device 10.

Example Effects

As described above, in the inertial navigation device error correction system 1 and the inertial navigation device error correction method according to the example embodiment, the error correction device 13 is configured to correct an error caused in the inertial navigation device 10 of the own aerial vehicle 2a, on the basis of the angle measurement residuals ($\Delta$AZ, $\Delta$EL) that are differences between the azimuth angle AZ1 and the elevation angle EL1 of the other aerial vehicle 2b based on the own aerial vehicle data and the azimuth angle AZ2 and the elevation angle EL2 of the other aerial vehicle 2b based on the other aerial vehicle data. The azimuth angle AZ1 and the elevation angle EL1 of the other aerial vehicle 2b based on the own aerial vehicle data are calculated on the basis of the coordinates (az, el) of the other aerial vehicle 2b with respect to the own aerial vehicle 2a calculated by the coordinate calculation device 12. The azimuth angle AZ2 and the elevation angle EL2 of the other aerial vehicle 2b based on the other aerial vehicle data are calculated on the basis of the respective positions of the own aerial vehicle 2a and the other aerial vehicle 2b calculated by the respective inertial navigation devices 10 of the own aerial vehicle 2a and the other aerial vehicle 2b.

This makes it possible to appropriately correct an error caused in the inertial navigation device 10 mounted on the aerial vehicle 2 (e.g., bias errors caused in the acceleration sensor 10A and the angular velocity sensor 10B of the inertial navigation device 10).

Therefore, even in a situation where a method based on a GPS is susceptible to jamming or surrounding buildings, for example, making it difficult to identify the position (latitude, longitude, and altitude) of the own aerial vehicle 2a, or a situation where it is difficult to receive GPS signals, it is possible to fly autonomously by using the inertial navigation device 10 to calculate the position (latitude, longitude, and altitude) and the attitude (pitch, roll, and yaw) of the own aerial vehicle 2a.

[Processes for Improvement in Accuracy of Error Correction]

The above example embodiment describes the case of correcting an error caused in the inertial navigation device 10 of the own aerial vehicle 2a (e.g., bias errors caused in the acceleration sensor 10A and the angular velocity sensor 10B of the inertial navigation device 10), by equally handling all the angle measurement residuals ($\Delta$AZ, $\Delta$EL) calculated for all the other aerial vehicles 2b. All the other aerial vehicles 2b may be aerial vehicles 2 that are able to communicate with the own aerial vehicle 2a via the wireless communication device 11. All the angle measurement residuals ($\Delta$AZ, $\Delta$EL) may be equally handled by, for example, calculating the average of all the angle measurement residuals ($\Delta$AZ, $\Delta$EL).

However, if the inertial navigation device 10 of the other aerial vehicle 2b is malfunctioning, or the other aerial vehicle 2b (or another person pretending to be the other aerial vehicle 2b) intentionally issues erroneous information for interference, for example, accuracy of error correction can decrease.

Hence, some processes, for example, that may be added to the above flow to improve the accuracy of error correction are described below.

[Doubt Signal and Use Determination]

As described above, the aerial vehicles 2, including the own aerial vehicle 2a and the other aerial vehicle 2b, may each issue information on its own position (latitude, longitude, and altitude) calculated by the inertial navigation device 10 mounted on the aerial vehicle 2. However, the information on the position issued from a given other aerial vehicle 2bi seems not to be credible in the following cases, for example.

(A) A case where variation (e.g., standard deviation σi) of angle measurement residuals ($\Delta$AZi, $\Delta$ELi) repeatedly calculated for the other aerial vehicle 2bi is small, but magnitude of the angle measurement residuals ($\Delta$AZi, $\Delta$ELi) themselves is large.

In one example, a case where the standard deviation σi of the angle measurement residuals ($\Delta$AZi, $\Delta$ELi) repeatedly calculated for the other aerial vehicle 2bi is less than a predetermined threshold, indicating a small variation, but one or both of absolute values of $\Delta$AZi and $\Delta$ELi is as large as a predetermined threshold or more.

In other words, this may be a case where the angle measurement residuals ($\Delta$AZi, $\Delta$ELi) calculated for the other aerial vehicle 2bi are similar values every time, but a state in which the magnitude of the angle measurement residuals ($\Delta$AZi, $\Delta$ELi) is large continues.

This seems to be a case where the inertial navigation device 10 of the other aerial vehicle 2bi is malfunctioning, or the other aerial vehicle 2bi (or another person) is intentionally issuing erroneous information.

(B) A case where the variation (e.g., the standard deviation σi) of the angle measurement residuals ($\Delta$AZi, $\Delta$ELi) repeatedly calculated for the other aerial vehicle 2bi is large. In other words, this may be a case where the standard deviation σi of the angle measurement residuals ($\Delta$AZi, $\Delta$ELi) calculated for the other aerial vehicle 2bi every time is the predetermined threshold or more, indicating a large variation.

This seems to be a case where the inertial navigation device 10 of the other aerial vehicle 2bi is malfunctioning.

Hence, in the example embodiment, the error correction device 13 of the own aerial vehicle 2a may be configured to issue, in the above case, a signal indicating that the information on the position of the other aerial vehicle 2bi is not credible, to other aerial vehicles 2b including the other aerial vehicle 2bi. In one embodiment, the other aerial vehicles 2b including the other aerial vehicle 2bi may serve as "third aerial vehicles". The above case may correspond to a case where the error correction device 13 determines that the angle measurement residuals ($\Delta$AZi, $\Delta$ELi) satisfy the condition of (A) or (B) described above, for example, thus not being credible. The angle measurement residuals ($\Delta$AZi, $\Delta$ELi) may be calculated on the basis of the information on the position (latitude, longitude, and altitude) of the other aerial vehicle 2b calculated by the inertial navigation device 10 of the other aerial vehicle 2bi and received from the other aerial vehicle 2bi.

Hereinafter, this signal may be referred to as a doubt signal.

The doubt signal may include, for example, the ID of the target other aerial vehicle 2bi determined as issuing information that is not credible, the ID of the own aerial vehicle 2a that issues the doubt signal, and a type of doubt (e.g., (A) or (B) described above).

In a case where the own aerial vehicle 2a or another aerial vehicle 2b other than a given other aerial vehicle 2bi issues a doubt signal for the other aerial vehicle 2bi, the error correction device 13 of the own aerial vehicle 2a may be configured to make a use determination to prevent the angle measurement residuals ($\Delta AZi$, $\Delta ELi$) calculated for the other aerial vehicle 2bi from being used for correction of an error caused in the inertial navigation device 10 of the own aerial vehicle 2a.

With such a configuration, it is possible to prevent the information on the position of the other aerial vehicle 2bi calculated by the malfunctioning inertial navigation device 10 of the other aerial vehicle 2bi, or the information on the position of the other aerial vehicle 2bi intentionally issuing erroneous information for interference, for example, from being used for correction of an error caused in the inertial navigation device 10 of the own aerial vehicle 2a. This makes it possible to improve the accuracy of error correction.

On the other hand, in a case where the other aerial vehicle 2bi issues doubt signals to a large number of other aerial vehicles (including the own aerial vehicle 2a) other than the other aerial vehicle 2bi, there is a possibility that the inertial navigation device 10 of the other aerial vehicle 2bi itself is malfunctioning.

There is also a possibility that the other aerial vehicle 2bi (or another person) is intentionally issuing a large number of doubt signals to disturb the system, for example.

Therefore, in a case where a given other aerial vehicle 2bi is issuing doubt signals to, for example, a predetermined proportion or more of other aerial vehicles 2bi (including the own aerial vehicle 2a) other than the other aerial vehicle 2bi, out of all the aerial vehicles 2 that are able to communicate with the other aerial vehicle 2bi, the error correction device 13 of the own aerial vehicle 2a may be configured to ignore the doubt signal issued by the other aerial vehicle 2bi. The predetermined proportion may be half, for example.

In this case, the error correction device 13 of the own aerial vehicle 2a may be configured to make a use determination to allow the angle measurement residuals ($\Delta AZ$, $\Delta EL$) calculated for the other aerial vehicles 2bi other than the other aerial vehicle 2bi issuing a large number of doubt signals to be used for correction of an error caused in the inertial navigation device 10 of the own aerial vehicle 2a.

In this case, another aerial vehicle 2bi other than the other aerial vehicle 2bi issuing a large number of doubt signals seems not to include the malfunctioning inertial navigation device 10 and seems not to intend to disturb the system, for example. For another aerial vehicle 2bi serving as the target of a doubt signal issued by this other aerial vehicle 2bi, the error correction device 13 of the own aerial vehicle 2a may make a use determination to prevent the angle measurement residuals ($\Delta AZ$, $\Delta EL$) calculated for the other aerial vehicle 2bi from being used for correction of an error caused in the inertial navigation device 10 of the own aerial vehicle 2a.

In addition, another criterion may be taken into consideration in the use determination of determining whether to use the angle measurement residuals ($\Delta AZ$, $\Delta EL$) calculated for a given other aerial vehicle 2bi for correction of an error caused in the inertial navigation device 10 of the own aerial vehicle 2a.

[Weighting]

The angle measurement residuals ($\Delta AZ$, $\Delta EL$) calculated for all the other aerial vehicles 2b (i.e., aerial vehicles 2 that are able to communicate with the own aerial vehicle 2a via the wireless communication device 11) may be weighted to be used for correction of an error caused in the inertial navigation device 10 of the own aerial vehicle 2a.

Described below are some factors that may be considered in performing weighting.

[Distance Between Own Aerial Vehicle and Other Aerial Vehicle]

Figure 7:
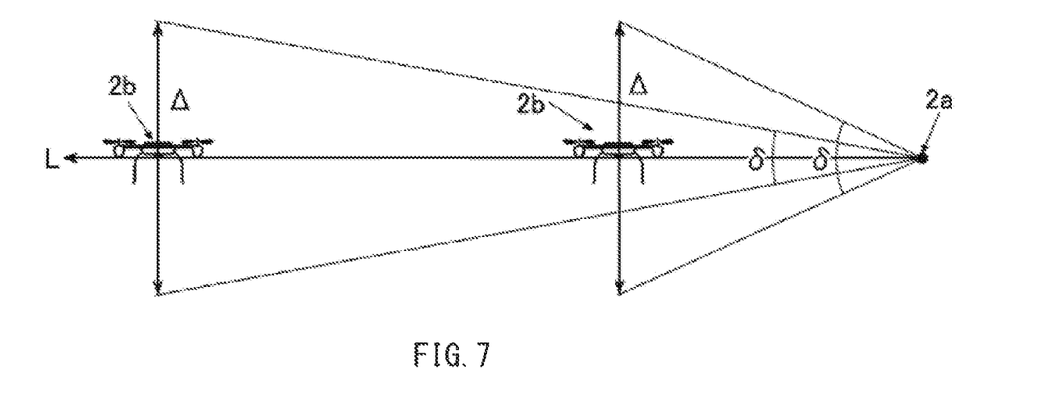
FIG. 7 is an explanatory diagram illustrating an example in which, as a distance between the own aerial vehicle and the other aerial vehicle is longer, an error in the azimuth angle and the elevation angle of the other aerial vehicle with respect to the own aerial vehicle, which corresponds to an error in the position, is smaller.

As illustrated in FIG. 7, assume a case where, for example, errors $\Delta$ in the positions (latitudes, longitudes, and altitudes) calculated by the inertial navigation devices 10 of two other aerial vehicles 2b are on the same level. The errors $\Delta$ are conceptually indicated by arrows in an up-down direction in FIG. 7. In such a case, as a distance L between the own aerial vehicle 2a and the other aerial vehicle 2b is longer, an error $\delta$ in the azimuth angle and the elevation angle of the other aerial vehicle 2b with respect to the own aerial vehicle 2a, which corresponds to the error A in the position, may be smaller.

In other words, in a case where the distance L from the own aerial vehicle 2a to the other aerial vehicle 2b is long, even if there is a somewhat large error A in the position calculated by the inertial navigation device 10 of the other aerial vehicle 2b, the error A has a smaller influence on the azimuth angle and the elevation angle of the other aerial vehicle 2b with respect to the own aerial vehicle 2a, as compared with a case where the distance L from the own aerial vehicle 2a to the other aerial vehicle 2b is short. Therefore, the angle measurement residuals ($\Delta AZ$, $\Delta EL$) calculated for the other aerial vehicle 2b present at a long distance L may have higher accuracy than the angle measurement residuals ($\Delta AZ$, $\Delta EL$) calculated for the other aerial vehicle 2b present at a short distance L.

Accordingly, the error correction device 13 of the own aerial vehicle 2a may be configured to weight angle measurement residuals ($\Delta AZj$, $\Delta ELj$) to assign a larger weight for a given other aerial vehicle 2bj present at a longer distance Lj from the own aerial vehicle 2a, and to correct an error caused in the inertial navigation device 10 of the own aerial vehicle 2a on the basis of the angle measurement residuals as described above.

A weight wj in this case, i.e., the weight wj(Lj) related to the distance Lj between the own aerial vehicle and the other aerial vehicle, may be expressed, for example, by:

$$wj(Lj)=\exp(-\alpha/Lj) \qquad (3),$$

where $\alpha$ is a constant.

[Effective Angle Measurement Target Number]

In the example embodiment, in a case where a solid angle $\Omega$ representing the angle measurement residuals ($\Delta AZ$, $\Delta EL$) calculated for a given other aerial vehicle 2b by the error correction device 13 of the own aerial vehicle 2a is as small as a set threshold or less, an accuracy confirmation signal including the ID of the other aerial vehicle 2b may be issued to indicate that the accuracy of the position and the attitude calculated by the inertial navigation device 10 of the own aerial vehicle 2a has been confirmed for at least the other aerial vehicle 2b.

The accuracy confirmation signal may include, in addition to the ID of the target other aerial vehicle 2b for which the accuracy has been confirmed, at least the ID of the own aerial vehicle 2a that issues the accuracy confirmation signal. Note that the above threshold set for the solid angle Q may be made variable. For example, the threshold may be set to a large value at a time when the own aerial vehicle 2a recognizes the other aerial vehicle 2b for the first time, and may be gradually made smaller each time an error correction process is repeated.

In a case of such a configuration, as the number Nj of accuracy confirmation signals including the ID of a given other aerial vehicle 2bj (hereinafter referred to as an effective angle measurement target number Nj) is larger, the accuracy of the positions and the attitudes of a larger number of aerial vehicles 2 seems to have been confirmed for the other aerial vehicle 2bj. In other words, as the number Nj of aerial vehicles 2 that name a given other aerial vehicle 2bj as the target for which the accuracy has been confirmed is larger, the accuracy of the positions and the attitudes of a larger number of aerial vehicles 2 seems to have been confirmed for the other aerial vehicle 2bj.

A large weight may be assigned in using the angle measurement residuals ($\Delta AZj$, $\Delta ELj$) calculated for the other aerial vehicle 2bj for correction of an error caused in the inertial navigation device 10 of the own aerial vehicle 2a. This makes it possible to improve the accuracy of error correction.

Accordingly, the error correction device 13 of the own aerial vehicle 2a may be configured to perform weighting to assign, as the number Nj of accuracy confirmation signals including the ID of a given other aerial vehicle 2bj (i.e., the effective angle measurement target number Nj) is larger, a larger weight wj to the angle measurement residuals ($\Delta AZj$, $\Delta ELj$) calculated for the other aerial vehicle 2bj. The error correction device 13 of the own aerial vehicle 2a may be configured to correct an error caused in the inertial navigation device 10 of the own aerial vehicle 2a on the basis of the angle measurement residuals.

The weight wj in this case, i.e., the weight wj (Nj) related to the effective angle measurement target number Nj, may be expressed, for example, by:

$$wj(Nj) = \exp(-\beta/Nj) \quad (4),$$

where $\beta$ is a constant.

[Stability of Variation of Angle Measurement Residuals]

As described in the above description on the doubt signal, in a case where the variation (e.g., the standard deviation $\sigma i$) of the angle measurement residuals ($\Delta AZi$, $\Delta ELi$) calculated for a given other aerial vehicle 2bi is small, but the magnitude of the angle measurement residuals ($\Delta AZi$, $\Delta ELi$) themselves is large (see (A) described above), there is a possibility that the inertial navigation device 10 of the other aerial vehicle 2bi is malfunctioning or the other aerial vehicle 2bi (or another person) is intentionally issuing erroneous information.

However, as described above, if a solid angle $\Omega j$ representing the angle measurement residuals ($\Delta AZj$, $\Delta ELj$) calculated for a given other aerial vehicle 2bj is the threshold or less, indicating a small variation, the other aerial vehicle 2bj may be the target of an issued accuracy confirmation signal. For the other aerial vehicle 2bj, there is no possibility or a very low possibility that the inertial navigation device 10 of the other aerial vehicle 2bj is malfunctioning or the other aerial vehicle 2bj (or another person) is intentionally issuing erroneous information.

In such a case, if the variation of the angle measurement residuals ($\Delta AZj$, $\Delta ELj$) calculated for the other aerial vehicle 2bj is small (i.e., if the variation of the angle measurement residuals is stable), credibility of the angle measurement residuals may be higher than in a case where the variation is large. A large weight may be assigned in using such angle measurement residuals for correction of an error caused in the inertial navigation device 10 of the own aerial vehicle 2a. This makes it possible to improve the accuracy of error correction.

Accordingly, the error correction device 13 of the own aerial vehicle 2a may be configured to perform weighting to assign, as the variation (e.g., the standard deviation $\sigma j$) of the angle measurement residuals ($\Delta AZj$, $\Delta ELj$) calculated for the other aerial vehicle 2bj serving as the target of an issued accuracy confirmation signal is smaller, a larger weight wj to the angle measurement residuals ($\Delta AZj$, $\Delta ELj$) calculated for the other aerial vehicle 2bj. The error correction device 13 of the own aerial vehicle 2a may be configured to correct an error caused in the inertial navigation device 10 of the own aerial vehicle 2a on the basis of the angle measurement residuals.

The weight wj in this case, i.e., the weight wj ($\sigma j$) related to the standard deviation $\sigma j$ of the angle measurement residuals, may be expressed, for example, by:

$$wj(\sigma j) = \exp(-\gamma \cdot \sigma j) \quad (5),$$

where $\gamma$ is a constant.

In the example embodiment, in consideration of the above expressions (3) to (5), the error correction device 13 of the own aerial vehicle 2a may calculate the weight wj of the angle measurement residuals ($\Delta AZj$, $\Delta ELj$) calculated for a given other aerial vehicle 2bj, by using the following expression (6).

$$w_j = \frac{1}{\sum_j w_j} \times \exp\left(-\frac{\alpha}{L_j}\right) \times \exp\left(-\frac{\beta}{N_j}\right) \times \exp(-\gamma \cdot \sigma_j) \quad (6)$$

Thus, in the example embodiment, weighting may be performed on the angle measurement residuals ($\Delta AZj$, $\Delta ELj$) calculated for the other aerial vehicle 2b to assign a smaller weight wj for the angle measurement residuals ($\Delta AZj$, $\Delta ELj$) with low credibility and assign a larger weight wj for the angle measurement residuals ($\Delta AZj$, $\Delta ELj$) with high credibility. An error caused in the inertial navigation device 10 of the own aerial vehicle 2a may be corrected on the basis of the angle measurement residuals. This configuration makes it possible to increase the other aerial vehicles 2b serving as the targets of the accuracy confirmation signals issued by each other. Thus, the aerial vehicles 2 (including the own aerial vehicle 2a) that are mounted with the respective inertial navigation devices 10 and fly autonomously are able to reduce errors caused in the inertial navigation devices 10 as a whole.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The error correction device 13 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the error correction device 13. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the error correction device 13 illustrated in FIG. 2.

The invention claimed is:

1. An inertial navigation device error correction system for aerial vehicles, each of the aerial vehicles being configured to fly autonomously on a basis of a position and an attitude calculated by an inertial navigation device mounted on the each of the aerial vehicles, the inertial navigation device error correction system comprising:
   the inertial navigation device;
   a wireless communication device;
   a coordinate calculation device configured to calculate coordinates of a second aerial vehicle of the aerial vehicles with respect to a first aerial vehicle of the aerial vehicles to which the inertial navigation device error correction system is to be applied, the second aerial vehicle being different from the first aerial vehicle; and
   an error correction device, wherein
   the inertial navigation device, the wireless communication device, the coordinate calculation device, and the error correction device are mounted on the each of the aerial vehicles, and
   the error correction device is configured to
      calculate an azimuth angle and an elevation angle of the second aerial vehicle based on first data on the first aerial vehicle, on a basis of the coordinates of the second aerial vehicle with respect to the first aerial vehicle calculated by the coordinate calculation device,
      calculate an azimuth angle and an elevation angle of the second aerial vehicle based on second data on the second aerial vehicle, on a basis of information on the position of the second aerial vehicle calculated by the inertial navigation device of the second aerial vehicle and received from the second aerial vehicle by the wireless communication device, and information on the position of the first aerial vehicle calculated by the inertial navigation device of the first aerial vehicle, and
      correct an error caused in the inertial navigation device of the first aerial vehicle, on a basis of angle measurement residuals that are differences between the azimuth angle and the elevation angle of the second aerial vehicle based on the first data and the azimuth angle and the elevation angle of the second aerial vehicle based on the second data.

2. The inertial navigation device error correction system according to claim 1, wherein the error correction device is configured to calculate the azimuth angle and the elevation angle of the second aerial vehicle based on the first data, on a basis of the coordinates of the second aerial vehicle with respect to the first aerial vehicle calculated by the coordinate calculation device, and information on the attitude of the first aerial vehicle calculated by the inertial navigation device of the first aerial vehicle.

3. The inertial navigation device error correction system according to claim 2, wherein the error correction device is configured to calculate, as the azimuth angle and the elevation angle of the second aerial vehicle based on the second data, an azimuth angle and an elevation angle of a vector that is directed from the position of the first aerial vehicle calculated by the inertial navigation device of the first aerial vehicle toward the position of the second aerial vehicle calculated by the inertial navigation device of the second aerial vehicle.

4. The inertial navigation device error correction system according to claim 3, wherein the error correction device is configured to issue, in a case where the error correction device determines that the information on the position of the second aerial vehicle calculated by the inertial navigation device of the second aerial vehicle and received from the second aerial vehicle is not credible, a signal indicating that the information on the position of the second aerial vehicle is not credible to third aerial vehicles including the second aerial vehicle, the third aerial vehicles being different from the first aerial vehicle.

5. The inertial navigation device error correction system according to claim 3, wherein the error correction device is configured to weight the angle measurement residuals to assign a larger weight for the second aerial vehicle present at a longer distance from the first aerial vehicle, and to correct the error caused in the inertial navigation device of the first aerial vehicle on the basis of the angle measurement residuals.

6. The inertial navigation device error correction system according to claim 2, wherein the error correction device is configured to issue, in a case where the error correction device determines that the information on the position of the second aerial vehicle calculated by the inertial navigation device of the second aerial vehicle and received from the second aerial vehicle is not credible, a signal indicating that the information on the position of the second aerial vehicle is not credible to third aerial vehicles including the second aerial vehicle, the third aerial vehicles being different from the first aerial vehicle.

7. The inertial navigation device error correction system according to claim 2, wherein the error correction device is configured to weight the angle measurement residuals to assign a larger weight for the second aerial vehicle present at a longer distance from the first aerial vehicle, and to correct the error caused in the inertial navigation device of the first aerial vehicle on the basis of the angle measurement residuals.

8. The inertial navigation device error correction system according to claim 2, wherein the error correction device is configured to issue, in a case where a solid angle representing the angle measurement residuals calculated for the second aerial vehicle is a threshold or less, an accuracy confirmation signal including identification information of the second aerial vehicle.

9. The inertial navigation device error correction system according to claim 2, wherein the error correction device is configured to issue, in a case where a solid angle representing the angle measurement residuals calculated for the second aerial vehicle is a threshold or less, an accuracy confirmation signal including identification information of the second aerial vehicle.

10. The inertial navigation device error correction system according to claim 1, wherein the error correction device is configured to calculate, as the azimuth angle and the elevation angle of the second aerial vehicle based on the second data, an azimuth angle and an elevation angle of a vector that is directed from the position of the first aerial vehicle calculated by the inertial navigation device of the first aerial vehicle toward the position of the second aerial vehicle calculated by the inertial navigation device of the second aerial vehicle.

11. The inertial navigation device error correction system according to claim 10, wherein the error correction device is configured to issue, in a case where the error correction device determines that the information on the position of the second aerial vehicle calculated by the inertial navigation device of the second aerial vehicle and received from the second aerial vehicle is not credible, a signal indicating that the information on the position of the second aerial vehicle is not credible to third aerial vehicles including the second aerial vehicle, the third aerial vehicles being different from the first aerial vehicle.

12. The inertial navigation device error correction system according to claim 10, wherein the error correction device is configured to weight the angle measurement residuals to assign a larger weight for the second aerial vehicle present at a longer distance from the first aerial vehicle, and to correct the error caused in the inertial navigation device of the first aerial vehicle on the basis of the angle measurement residuals.

13. The inertial navigation device error correction system according to claim 10, wherein the error correction device is configured to issue, in a case where a solid angle representing the angle measurement residuals calculated for the second aerial vehicle is a threshold or less, an accuracy confirmation signal including identification information of the second aerial vehicle.

14. The inertial navigation device error correction system according to claim 1, wherein the error correction device is configured to issue, in a case where the error correction device determines that the information on the position of the second aerial vehicle calculated by the inertial navigation device of the second aerial vehicle and received from the second aerial vehicle is not credible, a signal indicating that the information on the position of the second aerial vehicle is not credible to third aerial vehicles including the second aerial vehicle, the third aerial vehicles being different from the first aerial vehicle.

15. The inertial navigation device error correction system according to claim 1, wherein the error correction device is configured to weight the angle measurement residuals to assign a larger weight for the second aerial vehicle present at a longer distance from the first aerial vehicle, and to correct the error caused in the inertial navigation device of the first aerial vehicle on the basis of the angle measurement residuals.

16. The inertial navigation device error correction system according to claim 1, wherein the error correction device is configured to issue, in a case where a solid angle representing the angle measurement residuals calculated for the second aerial vehicle is a threshold or less, an accuracy confirmation signal including identification information of the second aerial vehicle.

17. An inertial navigation device error correction method for aerial vehicles, each of the aerial vehicles being configured to fly autonomously on a basis of a position and an attitude calculated by an inertial navigation device mounted on the each of the aerial vehicles, the inertial navigation device error correction method comprising:
   calculating, by a first aerial vehicle of the aerial vehicles to which the inertial navigation device error correction method is to be applied, coordinates of a second aerial vehicle of the aerial vehicles with respect to the first aerial vehicle, the second aerial vehicle being different from the first aerial vehicle;
   calculating an azimuth angle and an elevation angle of the second aerial vehicle based on first data on the first aerial vehicle, on a basis of the calculated coordinates of the second aerial vehicle with respect to the first aerial vehicle;
   calculating an azimuth angle and an elevation angle of the second aerial vehicle based on second data on the second aerial vehicle, on a basis of information on the position of the second aerial vehicle calculated by the inertial navigation device of the second aerial vehicle and received from the second aerial vehicle via a wireless communication device, and information on the position of the first aerial vehicle calculated by the inertial navigation device of the first aerial vehicle; and
   correcting an error caused in the inertial navigation device of the first aerial vehicle, on a basis of angle measurement residuals that are differences between the azimuth angle and the elevation angle of the second aerial vehicle based on the first data and the azimuth angle and the elevation angle of the second aerial vehicle based on the second data.

18. An inertial navigation device error correction system for aerial vehicles, each of the aerial vehicles being configured to fly autonomously on a basis of a position and an attitude calculated by an inertial navigation device mounted on the each of the aerial vehicles, the inertial navigation device error correction system comprising:
   the inertial navigation device;
   a wireless communication device;
   a coordinate calculation device configured to calculate coordinates of a second aerial vehicle of the aerial vehicles with respect to a first aerial vehicle of the aerial vehicles to which the inertial navigation device error correction system is to be applied, the second aerial vehicle being different from the first aerial vehicle; and
   circuitry, wherein
   the inertial navigation device, the wireless communication device, the coordinate calculation device, and the circuitry are mounted on the each of the aerial vehicles, and
   the circuitry is configured to
      calculate an azimuth angle and an elevation angle of the second aerial vehicle based on first data on the first aerial vehicle, on a basis of the coordinates of the second aerial vehicle with respect to the first aerial vehicle calculated by the coordinate calculation device,
      calculate an azimuth angle and an elevation angle of the second aerial vehicle based on second data on the second aerial vehicle, on a basis of information on the position of the second aerial vehicle calculated by the inertial navigation device of the second aerial vehicle and received from the second aerial vehicle by the wireless communication device, and information on the position of the first aerial vehicle calculated by the inertial navigation device of the first aerial vehicle, and
      correct an error caused in the inertial navigation device of the first aerial vehicle, on a basis of angle measurement residuals that are differences between the azimuth angle and the elevation angle of the second aerial vehicle based on the first data and the azimuth angle and the elevation angle of the second aerial vehicle based on the second data.

* * * * *